(12) United States Patent
Wang et al.

(10) Patent No.: US 12,401,084 B2
(45) Date of Patent: Aug. 26, 2025

(54) BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Xuguang Wang, Fujian (CN); Jihua Yao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 812 days.

(21) Appl. No.: 17/565,890

(22) Filed: Dec. 30, 2021

(65) Prior Publication Data

US 2022/0123419 A1    Apr. 21, 2022

Related U.S. Application Data

(63) Continuation of application No. PCT/CN2020/118770, filed on Sep. 29, 2020.

(30) Foreign Application Priority Data

Nov. 27, 2019  (CN) .......................... 201922071093.8

(51) Int. Cl.
*H01M 50/287*   (2021.01)
*H01M 10/48*    (2006.01)
(Continued)

(52) U.S. Cl.
CPC ....... *H01M 50/287* (2021.01); *H01M 10/486* (2013.01); *H01M 50/298* (2021.01); *H01M 50/519* (2021.01)

(58) Field of Classification Search
CPC ............ H01M 50/287; H01M 10/486; H01M 50/298; H01M 50/519; H01M 50/15; H01M 50/155; H01M 50/209; Y02E 60/10
See application file for complete search history.

(56) References Cited

U.S. PATENT DOCUMENTS

| 2015/0372281 A1 | 12/2015 | Ogasawara et al. |
| 2017/0207501 A1 | 7/2017  | Haydin et al. |
| 2018/0348305 A1 | 12/2018 | Schmid-Schoenbein et al. |

FOREIGN PATENT DOCUMENTS

| CN | 105321637 A | 2/2016 |
| CN | 108987835 A | 12/2018 |

(Continued)

OTHER PUBLICATIONS

International Search Report mailed Dec. 30, 2020 in International Application No. PCT/CN2020118770.

*Primary Examiner* — Helen Oi K Conley
(74) *Attorney, Agent, or Firm* — Venable LLP

(57) ABSTRACT

This application discloses a battery module, a battery pack, and a device, and relates to the field of battery technologies, to optimize a structure of the battery module. The battery module includes a battery, a wire harness board, a circuit board, and a temperature sensing assembly. The battery includes a top cover. The wire harness board is disposed on an outer side of the top of the top cover, and the wire harness board includes a body and a mounting portion disposed at the body. The circuit board is connected to the wire harness board. The temperature sensing assembly is mounted at the mounting portion, and pressed by the circuit board closely against the top cover. The battery module not only effectively implements temperature sensing at the top cover, but also prevents the temperature sensing assembly from being damaged due to excessive force applied by the circuit board.

7 Claims, 10 Drawing Sheets

(51) Int. Cl.
*H01M 50/298* (2021.01)
*H01M 50/519* (2021.01)

(56) References Cited

FOREIGN PATENT DOCUMENTS

| CN | 109148993 A | 1/2019 |
| CN | 210744091 U | 6/2020 |

BATTERY MODULE, BATTERY PACK, AND DEVICE

CROSS-REFERENCE TO RELATED APPLICATIONS

This application is a continuation of International Application No. PCT/CN2020/118770, entitled "BATTERY MODULE, BATTERY PACK AND DEVICE", filed on Sep. 29, 2020, which claims the priority of Chinese Patent Application No. 201922071093.8, entitled "BATTERY MODULE, BATTERY PACK, AND DEVICE", filed on Nov. 27, 2019, both of which are incorporated herein by reference in their entireties.

TECHNICAL FIELD

Embodiments of this application relate to the field of battery technologies, and in particular, to a battery module, a battery pack, and a device.

BACKGROUND

The normal operating temperature of a battery module ranges between −30° C. and 55° C. If the limit temperatures are exceeded, the battery module limits discharge power to protect battery module safety.

In the related art, a temperature sensing method of the battery module is as follows: sensing a temperature of a connection piece through a thermistor disposed at a flexible circuit board, and using the temperature of the connection piece as a temperature inside a battery. In practice, the temperature of the connection piece is higher, while the temperature inside the battery is lower. If a difference between the two temperatures is large, the battery module limits power in advance, which may affect performance of the battery module.

Currently, vehicle manufacturers in the industry are all developing in a direction of coupe model, and traditional modified electric vehicles should reflect the advantage and characteristic of the electric vehicles: fast acceleration. Therefore, a demand for a rapid acceleration working condition will be increasingly common, so power requirements for battery modules will be increasingly high.

Due to limited internal space in the battery module, and considering manufacturing and cost factors, width and thickness of the connection piece cannot be large. In a low-power condition, for example, discharging at 1 C, the temperature of the connection piece is close to the temperature inside the battery. However, if a higher discharge rate is used, the temperature of the connection piece far exceeds the temperature inside the battery. In a high-power condition, due to limited current flow area of the connection piece, the temperature of the connection piece rises sharply, while the temperature inside the battery rises slowly, and a temperature difference between the two is huge. This causes the battery module to limit the power in advance, affecting the discharge power of the battery module. Hence, a temperature sensing assembly is required to sense the battery temperature in related technologies.

The inventor finds that there are at least the following problems in some cases: A conventional temperature sensing assembly receives a relatively large pressure during mounting, putting the temperature sensing assembly at a risk of being crushed, which causes the temperature sensing assembly to fail and unable to sense the temperature properly.

SUMMARY

This application proposes a battery module, a battery pack, and a device to optimize a structure of the battery module.

This application proposes a battery module, including:
a battery, including a top cover;
a wire harness board, disposed on an outer side of the top of the top cover, where the wire harness board includes a body and a mounting portion disposed at the body;
a circuit board, connected to the wire harness board; and
a temperature sensing assembly, mounted at the mounting portion, and pressed by the circuit board closely against the top cover.

Therefore, during sensing the temperature inside the battery, the temperature transfer path is short and a temperature response speed is fast. This also makes control more accurate for subsequent processing based on the sensed temperature, so that efficiency of the battery module can be effectively exerted, and a structure and performance of the battery module are effectively optimized.

In some embodiments, the temperature sensing assembly includes:
a thermistor, electrically connected to the circuit board; and
a thermal pad, where the thermistor is sandwiched between the mounting portion and the thermal pad, and the thermal pad abuts against the top cover. An error between a temperature sensed by the thermistor and the temperature inside the battery is relatively small, the temperature sensing is accurate, and a response is fast.

In some embodiments, the mounting portion includes:
an elastic part, where the elastic part is connected to the body, a gap is present between part of an edge of the elastic part and the body, and the thermistor abuts against the elastic part.

In some embodiments, the mounting portion further includes:
a coaming, disposed around the elastic part and forming a cavity with the elastic part, where the thermistor is located within the cavity and abuts against the elastic part, and the thermal pad is sandwiched between the thermistor and the top cover. The coaming defines a mounting region of the thermal pad, so that the thermal pad does not move freely after being mounted in place, which improves stability of the battery module structure and reliability of connections between the components, and also makes the head of the thermistor stay securely and reliably in position.

In some embodiments, an observation hole is provided in the circuit board, and the observation hole is located above the cavity. Whether the thermal pad is mounted in place is observed through the observation hole.

In some embodiments, the wire harness board further includes a connection portion connected to the body, a mounting hole is correspondingly provided in the circuit board, and the connection portion snaps into the mounting hole.

In some embodiments, a gap is present between part of an edge of the connection portion and the body.

In some embodiments, a first positioning portion is provided at an edge of the circuit board, a second positioning portion is provided at the wire harness board, a gap is present between the second positioning portion and a surface of the wire harness board used for the circuit board to abut on, and at least part of the first positioning portion is accommodated in the gap. The first positioning portion and the second positioning portion are matched, so that the circuit board is securely mounted.

In some embodiments, the thermistor is connected to a connector plug, a connector socket is provided at the circuit board, and the connector plug is plugged into the connector socket, so that the thermistor is electrically connected to the circuit board.

An embodiment of this application further provides a battery pack, including the battery module according to any one of the technical solutions of this application.

An embodiment of this application further provides a device, including the battery pack according to any one of the technical solutions of this application, where the battery pack is configured to provide electrical energy.

In the battery module provided in the foregoing technical solution, the temperature sensing assembly is mounted in the mounting portion of the wire harness board, and the temperature sensing assembly directly abuts against the top cover of the battery. A temperature of the top cover is basically the same as the temperature inside the battery, and the top cover is capable of reflecting a change and level of the temperature inside the battery in a timely manner. If the temperature inside the battery rises, the temperature of the top cover rises in a timely manner; and if the temperature inside the battery drops, the temperature of the top cover drops in a timely manner. The temperature of the top cover varies with the temperature inside the battery in a timely manner.

In the battery module provided in the foregoing technical solution, a temperature transfer path of the battery module is as follows: The temperature inside the battery is transferred to the top cover, and the temperature of the top cover is directly transferred to the temperature sensing assembly. The temperature sensing assembly transfers the sensed temperature to components such as the circuit board for subsequent analysis, processing, and judgment. It can be learned from the foregoing temperature transfer path that in the battery module provided in the foregoing technical solution, during sensing the temperature inside the battery, the temperature transfer path is short and a temperature response speed is fast. This also makes control more accurate for subsequent processing based on the sensed temperature. Therefore, this can effectively reduce or even prevent occurrence of power limitation performed by the battery module in advance. In this way, efficiency of the battery module can be effectively exerted, a structure and performance of the battery module are effectively optimized, performance of a device (for example, a vehicle) using the battery module is also optimized, and reliability of the device is increased.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

The drawings described herein are intended for a further understanding of this application and constitute a part of this application. Example embodiments of this application and descriptions thereof are intended to explain this application, and do not constitute any inappropriate limitation on this application.

DESCRIPTION OF EMBODIMENTS

The technical solutions provided in this application will be described in more detail below with reference to FIG. 1 to FIG. 18.

Figure 1:
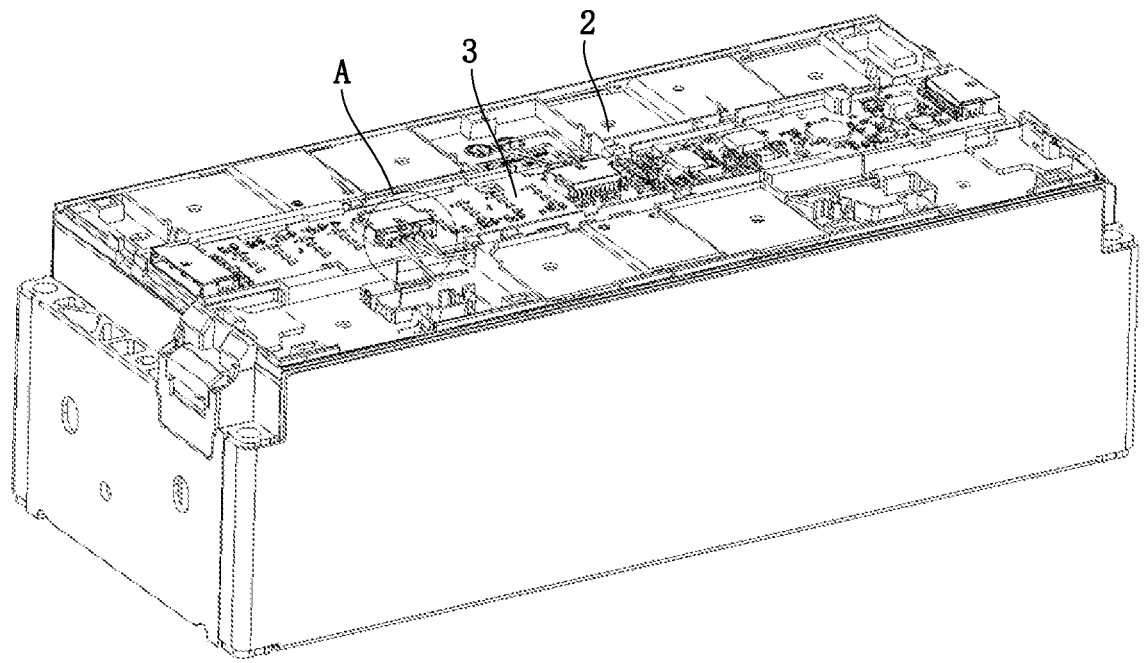
FIG. 1 is a three-dimensional schematic structural diagram of a battery module according to an embodiment of this application.
Figure 2:
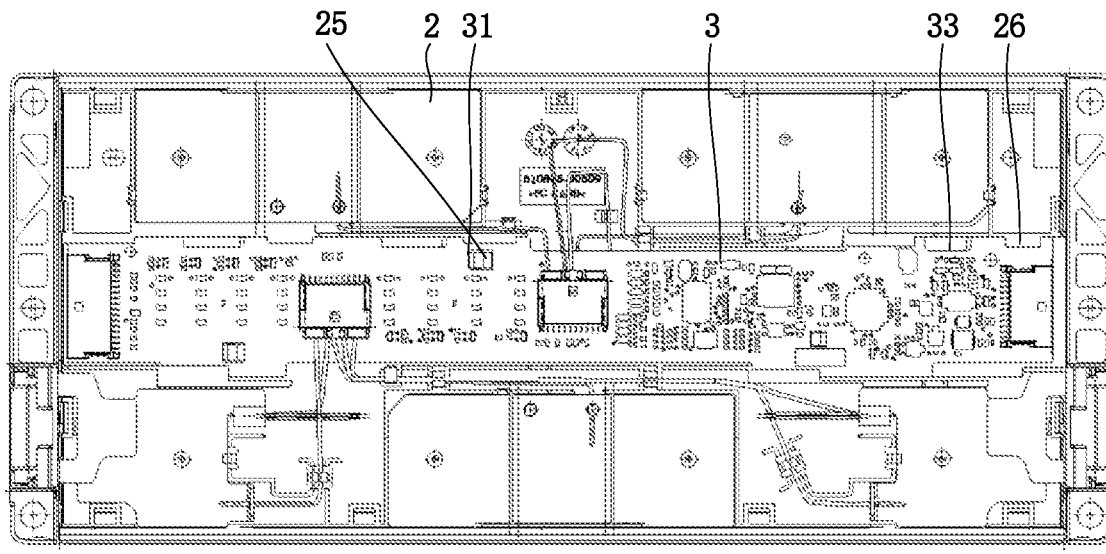
FIG. 2 is a schematic vertical view of a battery module according to an embodiment of this application.
Figure 3:
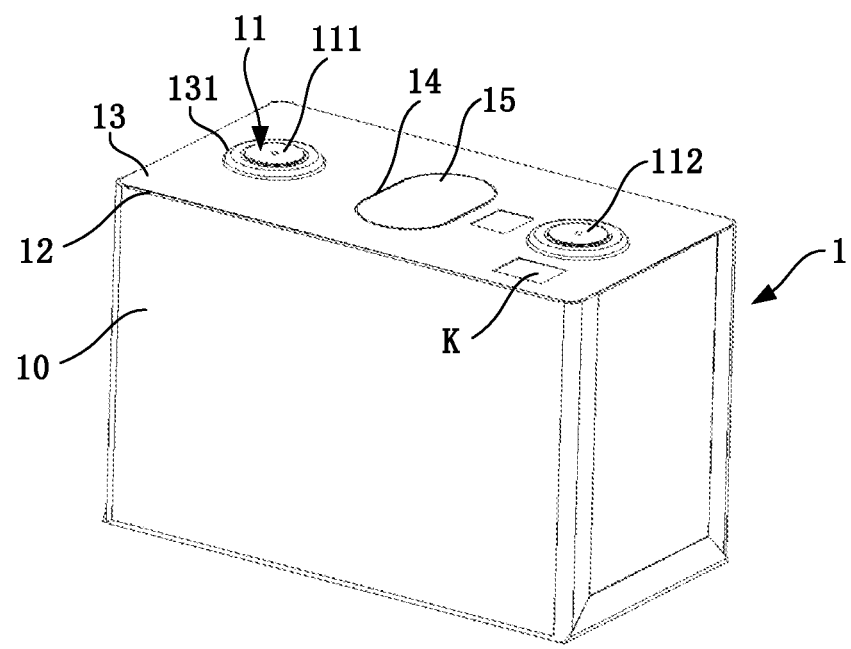
FIG. 3 is a schematic structural diagram of a battery of a battery module according to an embodiment of this application.
Figure 4:
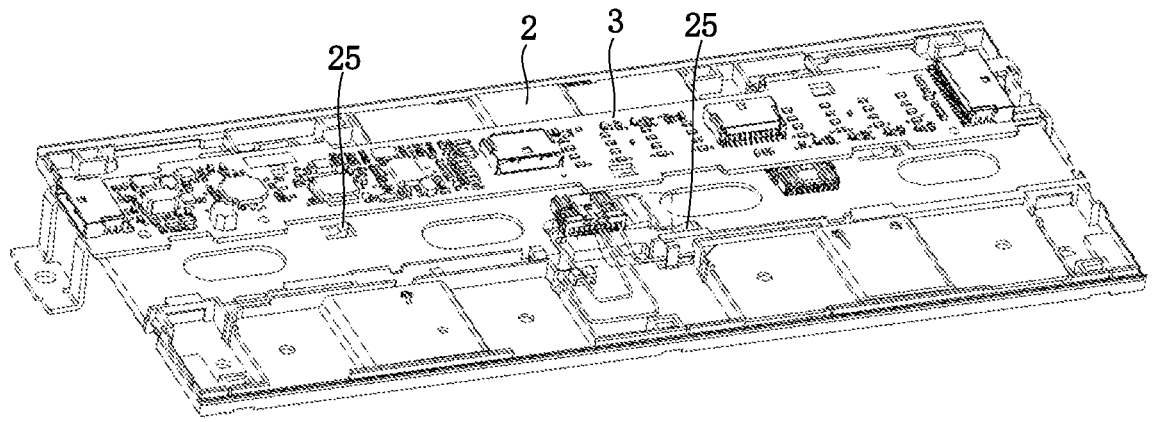
FIG. 4 is a schematic position diagram of a wire harness board and a circuit board of a battery module which are ready to be mounted according to an embodiment of this application.
Figure 5:
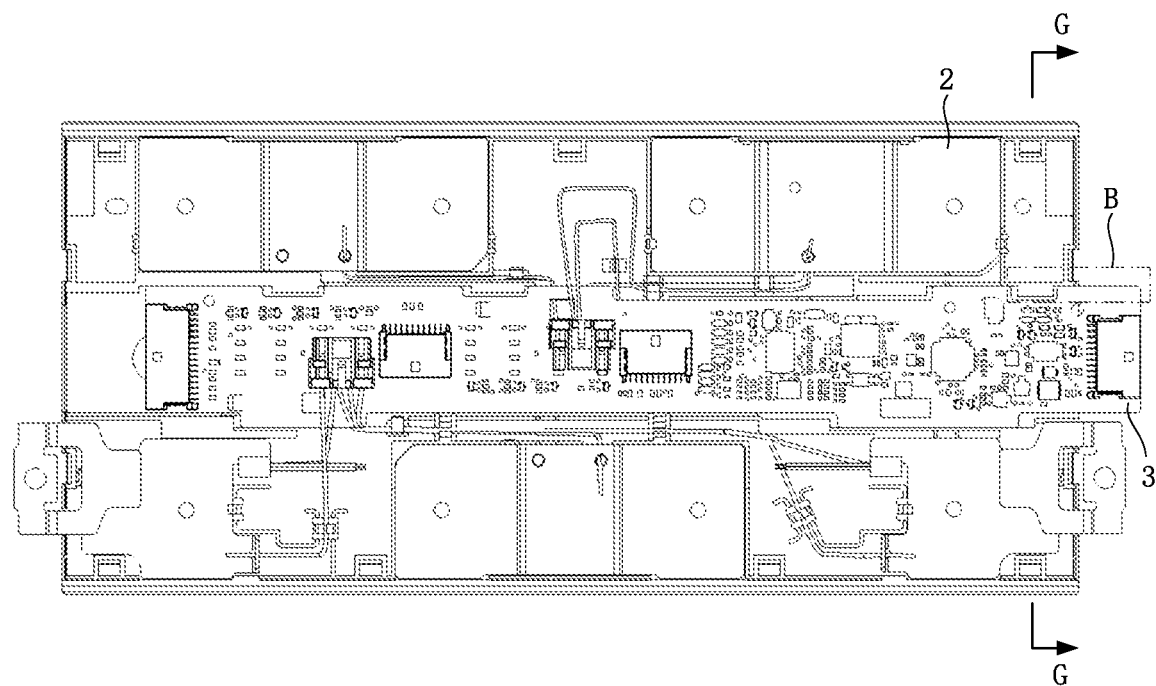
FIG. 5 is a schematic position diagram of a wire harness board and a circuit board of a battery module which are not mounted in place according to an embodiment of this application.
Figure 6:
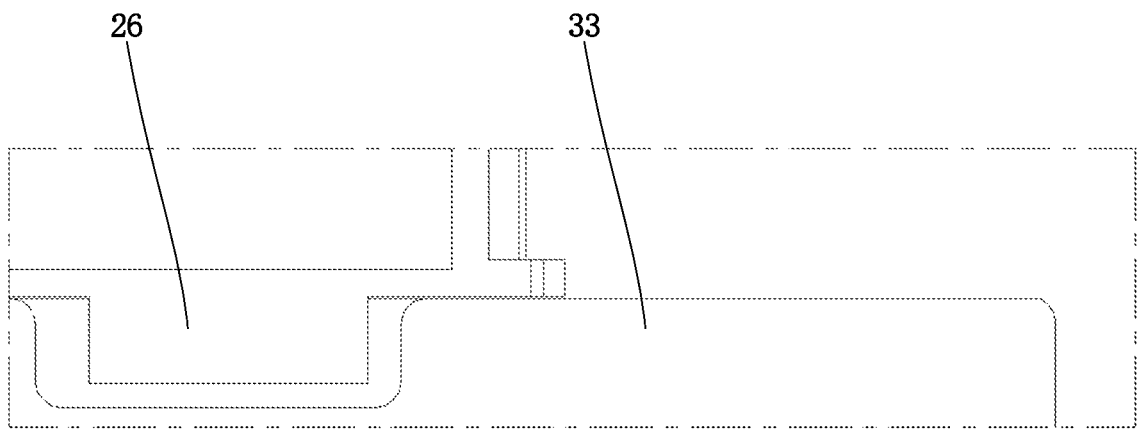
FIG. 6 is a local enlarged schematic diagram of B in FIG. 5.

Referring to FIG. 1 to FIG. 3, an embodiment of this application provides a battery module, including a battery 1, a wire harness board 2, a circuit board 3, and a temperature sensing assembly 4. The battery 1 includes a top cover 12. The wire harness board 2 is disposed on an outer side of the top of the top cover 12. The wire harness board 2 includes a body 20 and a mounting portion 21 disposed at the body 20. The circuit board 3 is connected, and specifically, for example, buckled, to the wire harness board 2. The temperature sensing assembly 4 is mounted at the mounting portion 21, and pressed by the circuit board 3 closely against the top cover 12.

In the battery module using the foregoing structure, a temperature sensing path is as follows: A temperature inside the battery 1 is transferred to the top cover 12, and a temperature of the top cover 12 is directly transferred to the temperature sensing assembly 4, then transferred by the temperature sensing assembly 4 to the circuit board 3 electrically connected to a thermistor 41 of the temperature sensing assembly 4, so that a temperature signal sensed by the thermistor 41 is transferred to the circuit board 3. So far, sensing of the temperature inside the battery 1 is completed. The temperature sensing assembly 4 transfers the sensed temperature to components such as the circuit board 3 for subsequent analysis, processing, and judgment.

It can be learned from the foregoing temperature transfer path that in the battery module provided in the foregoing technical solution, during sensing the temperature inside the battery 1, the temperature transfer path is short and a temperature response speed is fast. This also makes control more accurate for subsequent processing based on the sensed temperature. Therefore, this can effectively reduce or even prevent occurrence of power limitation performed by the battery module in advance. In this way, efficiency of the battery module can be effectively exerted, a structure and performance of the battery module are effectively optimized, performance of vehicle equipment using the battery module is also optimized, and reliability of the vehicle equipment is increased.

In some embodiments, in the foregoing technical solution, the circuit board 3 and the wire harness board 2 are specifically connected by using a buckle, the circuit board 3 is used to press the temperature sensing assembly 4 closely against the top cover 12, and no additional mounting structure is disposed at the temperature sensing assembly 4. The matching force of the circuit board 3 and the wire harness board 2 in the buckle connection is small, so a pressing force applied by the circuit board 3 against the temperature sensing assembly 4 is also small. This structure not only effectively implements temperature sensing from the top cover, but also prevents the temperature sensing assembly 4 from being damaged due to excessive force applied on the temperature sensing assembly 4, effectively ensuring reliability of sensing a temperature by the temperature sensing assembly 4, and also increasing operating reliability of the battery module.

The circuit board 3 for example is a PCB (Printed Circuit Board) board.

The following describes in detail a structure of each component and connection relationships between components in some embodiments.

A specific structure of the battery 1 is first described. Based on different manufacturing methods of electrode assemblies, the battery 1 is a laminated battery or a wound battery. The laminated battery is formed by cutting a positive electrode plate, a negative electrode plate, and a separator into a specified size and stacking the positive electrode plate, the separator, and the negative electrode plate. The wound battery is formed by winding a positive electrode plate, a negative electrode plate, and a separator.

Referring to FIG. 3, a structure of the battery 1 in some embodiments is as follows: The battery 1 includes a housing 10, an electrode assembly (not shown in the figure) disposed inside the housing 10, the top cover 12 disposed at the top of the electrode assembly, an electrode terminal 11 disposed at the top cover 12, and a top patch 13 disposed at the top of the top cover 12. Specifically, the top patch 13 is pasted to the top of the top cover 12. The top patch 13 is provided with an explosion-proof hole 14, and an explosion-proof valve 15 is mounted in the explosion-proof hole 14. The top patch 13 is further provided with two electrode terminal through-holes 131, and one electrode terminal 11 is mounted in each electrode terminal through-hole 131. The electrode terminal 11 includes a positive electrode terminal 111 and a negative electrode terminal 112.

A material of the top patch 13 is, for example, an insulating material. The top patch 13 is sheet-shaped, and its size matches a size of a top surface of the top cover 12. For example, the structure and the size of the top patch 13 are just big enough for the top patch 13 to completely cover the top surface of the top cover 12; or the size of the top patch 13 is slightly larger than the size of the top surface of the top cover 12, so that the top patch 13 is big enough to form a bent edge to cover the top cover 12.

The top patch 13 plays an insulating role to prevent the top cover 12 from being short-circuited with an external circuit. The top patch 13 also plays a protection role to prevent the top cover 12 from being scratched.

Referring to FIG. 3, specifically, an opening K is provided at a position of the top patch 13 close to the negative electrode terminal 112, the top cover 12 is located on an outer side of the bottom of the top patch 13, and the opening K exposes a partial region of the top cover 12. A thermal pad 42 of the temperature sensing assembly 4 described later is mounted in the opening K. Specifically, for example, the thermal pad 42 is pasted to a side wall of the opening K by using an adhesive; or the thermal pad 42 is directly pasted and fastened to the top cover 12; or the thermal pad 42 directly abuts against a position of the top cover 12 corresponding to the opening K, with no adhesive used. In some embodiments shown later, a specific mounting method of the thermal pad 42 is described. The thermal pad 42, after being mounted in place, is in close contact with the top cover 12. Because the thermal pad 42 is made of a thermal material, the thermal pad 42 is capable of transferring the temperature of the top cover 12 to a thermistor 41, and the temperature is then transferred via the thermistor 41 to the circuit board 3 described later, thereby implementing sensing the temperature of the top cover 12.

The foregoing temperature sensing assembly 4 may be disposed at any position around the negative electrode terminal 112, but considering mounting of other components, mounting space of the temperature sensing assembly 4 itself, and ease of mounting, in some embodiments, the temperature sensing assembly 4 is disposed on either side of the negative electrode terminal 112 in the width direction of the battery 1, as the position of the opening K shown in FIG. 3. The width direction of the battery 1 is a direction, in a plane where the top surface of the top patch 13 is located, perpendicular to the line connecting to the centers of the positive electrode terminal 111 and the negative electrode terminal 112.

A temperature of the top cover 12 near the negative electrode terminal 112 is closer to a real temperature inside the battery 1, and a temperature difference between the two temperatures under severe working conditions is within an acceptable 5° C. The temperature sensing assembly 4 is disposed close to the negative electrode terminal 112 of the battery 1. With the foregoing structure, a temperature transfer path is as follows: The temperature inside the battery 1 is transferred to the top cover 12; and the foregoing thermal pad 42 is disposed at the top cover 12 near the negative electrode terminal 112, so the temperature of the top cover 12 near the negative electrode terminal 112 is transferred to the thermal pad 42, then to the thermistor 41 of the temperature sensing assembly 4. Because the top cover 12 is in direct contact with the temperature sensing assembly 4, the temperature sensed by the thermistor 41 can more accurately reflect the temperature inside the battery 1. In the foregoing technical solution, even when the battery module operates in severe working conditions, an error between a temperature sensed by the thermistor 41 and a temperature inside the battery 1 is relatively small, so that the sensed temperature is accurate, and a response is fast.

Referring to FIG. 4 to FIG. 17, the following describes a structure of the wire harness board 2.

The structure of the wire harness board 2 is described from two aspects: a structure of the wire harness board 2 for fixedly mounting the temperature sensing assembly 4, and a structure of the wire harness board 2 for mounting the circuit board 3.

Figure 12:
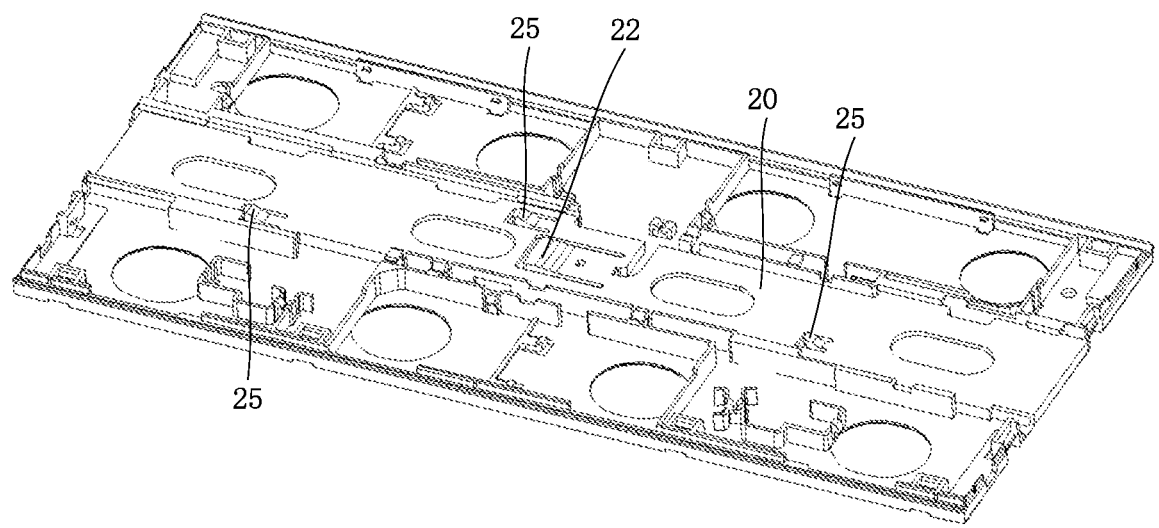
FIG. 12 is a three-dimensional schematic structural diagram of one side of a wire harness board of a battery module according to an embodiment of this application, with the side facing toward a circuit board.
Figure 17:
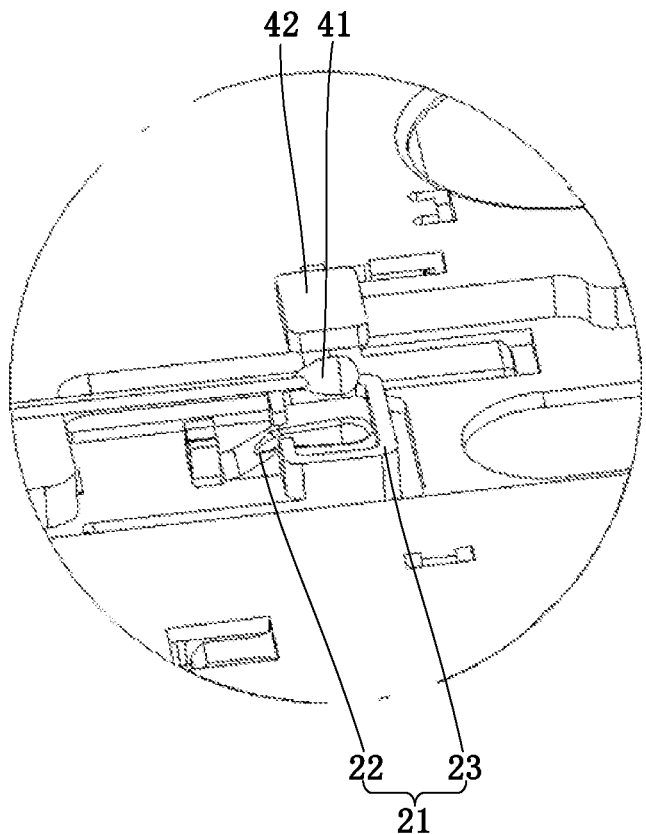
FIG. 17 is a local enlarged schematic diagram of D in FIG. 16.

Referring to FIG. 12 and FIG. 17, the structure of the wire harness board 2 for fixedly mounting the temperature sensing assembly 4 is first described.

The mounting portion 21 includes an elastic part 22, where the elastic part 22 is connected to the body 20, and a gap is present between part of an edge of the elastic part 22 and the body 20. The thermistor 41 abuts against the elastic part 22.

Figure 15:
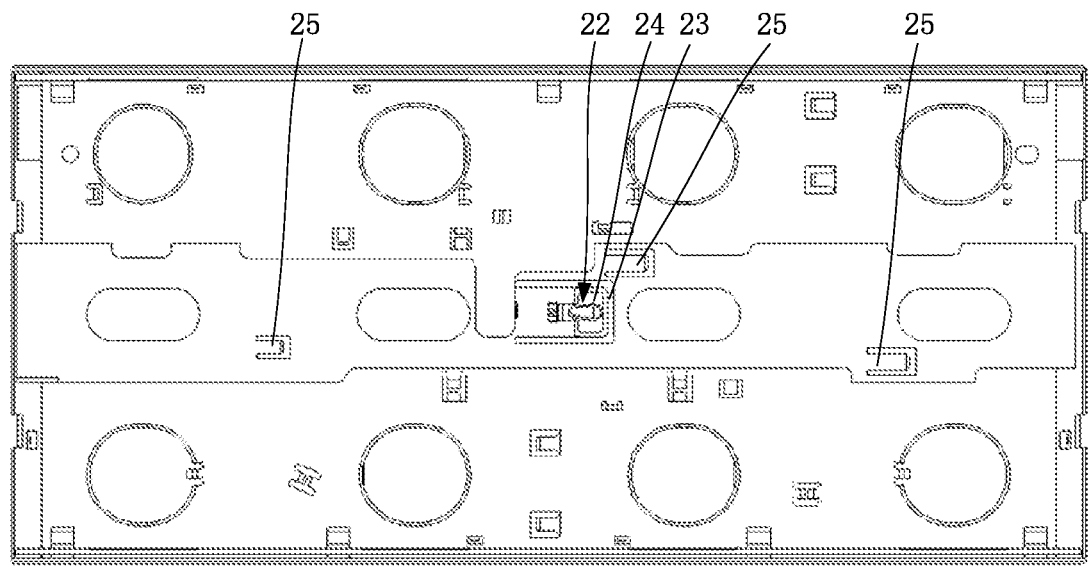
FIG. 15 is a schematic structural diagram of one side of a wire harness board of a battery module according to an embodiment of this application, with the side facing toward a battery.
Figure 16:
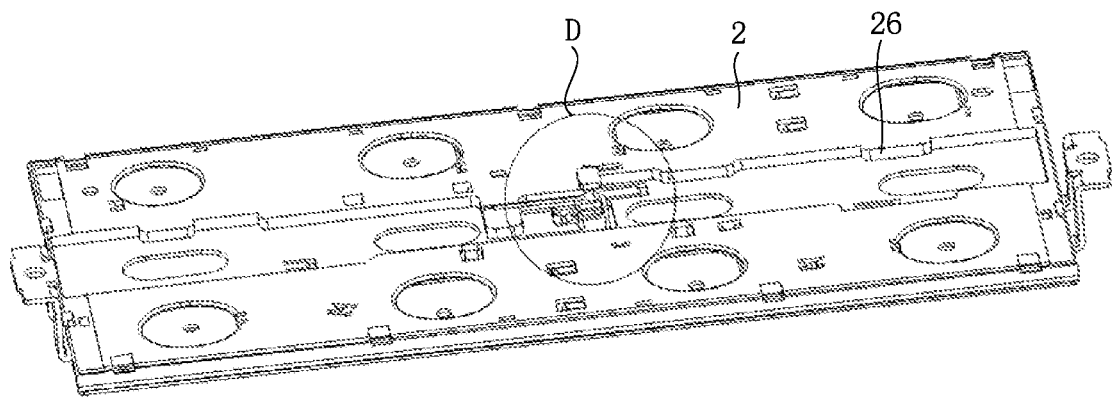
FIG. 16 is a schematic structural diagram of one side of a wire harness board and a thermistor of a battery module according to an embodiment of this application, with the side facing toward a battery.

In some embodiments, the mounting portion 21 of the wire harness board 2 further includes a coaming 23. The coaming 23 is disposed around the elastic part 22 and forms a cavity 24 with the elastic part 22. The thermistor 41 is located within the cavity 24 and abuts against the elastic part 22. The thermal pad 42 is sandwiched between the thermistor 41 and the top cover 12. The cavity 24 is located on a side of the wire harness board 2 facing toward the top cover 12, as shown in FIG. 15 to FIG. 17.

A cross-sectional shape of the cavity 24 is, for example, rectangular or circular. The cavity 24 has a specified depth, and the cavity 24 is used to place the thermal pad 42 of the temperature sensing assembly 4. A size of an opening of the cavity 24 is larger than a size (or the diameter) of the thermistor 41, and a size of the thermal pad 42 matches the size of the opening of the cavity 24, so the size of the thermal pad 42 is relatively large, and the thermal pad 42 and the thermistor 41 can be in complete contact. A side wall of the cavity 24 also plays a role of limiting the thermal pad 42, thereby restricting displacement of the thermal pad 42 in a plane of the circuit board 3, preventing the thermal pad 42 from displacing under severe working conditions, and preventing the thermistor 41 from failing to accurately sense a temperature.

Figure 14:
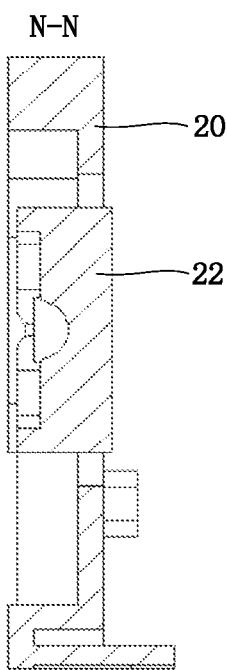
FIG. 14 is a schematic cross-sectional view taken along a line N-N in FIG. 13.

A through-hole is provided in the body 20, and the elastic part 22 is mounted in the through-hole. One end of the elastic part 22 is fixedly connected to or integrated with the body 20. The other end of the elastic part 22 is a free end. To be specific, a gap is present between the free end of the elastic part 22 and the body 20, and the free end of the elastic part 22 can swing in an up and down direction. The so-called up and down direction is a direction from the circuit board 3 to the battery 1. Referring to FIG. 14 and FIG. 20, a surface of the free end of the elastic part 22 is partially located on an outer side of a surface of the body 20. The free end of the elastic part 22 is, for example, provided with an inner groove, a shape of the inner groove matches a shape of a head of the thermistor 41 described later, and the head of the thermistor 41 is mounted in the inner groove.

Still referring to FIG. 17, the coaming 23 defines a mounting region of the thermal pad 42, so that the thermal pad 42 cannot move freely after being mounted in place, which improves stability of the battery module structure and reliability of connection relationships between the components, and also makes the head of the thermistor 41 stay securely and reliably in position. In a temperature sensing operation, a temperature can be sensed along the following temperature sensing path: from the top cover 12 of the battery 1 to the thermal pad 42, then from the thermal pad 42 to the head of the thermistor 41, and then from the head of the thermistor 41 to a temperature sensing circuit. The whole temperature sensing path is very short, and the temperature sensing is reliable.

Figure 13:
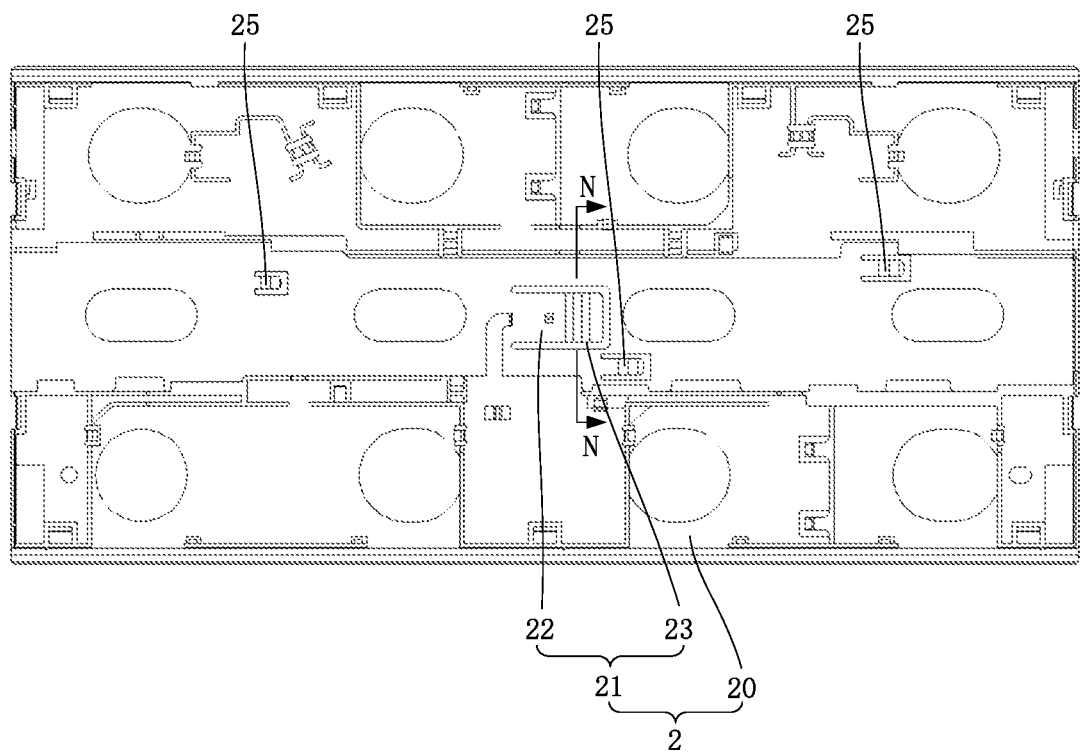
FIG. 13 is a front schematic structural diagram of one side of a wire harness board of a battery module according to an embodiment of this application, with the side facing toward a circuit board.

The structure of one side of the elastic part 22 facing toward the circuit board 3 is as shown in FIG. 12 to FIG. 14. When the elastic part 22 is not mounted, a surface of one side of the elastic part 22 facing toward the circuit board 3 is slightly higher than the surface of the body 20, as shown in FIG. 14. This structure subsequently enables the circuit board 3 to be pressed by the elastic part 22 to press the temperature sensing assembly 4 closely against the top cover 12.

In the foregoing technical solution, the head of the temperature sensing assembly 4 stays securely and reliably in position, and the pressing force applied on the head of the temperature sensing assembly 4 is relatively small, so that the temperature sensing assembly 4 is not prone to damage or failure. With the foregoing structure, the temperature sensing path is as follows: The temperature of the top cover 12 is directly transferred to the thermal pad 42, then to the thermistor 41, and then sensed by the circuit board 3. It is obvious that in the foregoing technical solution, the temperature sensing path is short, a temperature sensed by the thermistor 41 is comparatively the same as a temperature inside the battery 1, and the sensed temperature value is accurate. Further, the temperature sensing assembly 4 performs properly, improving operating reliability of the battery module.

Referring to FIG. 9 to FIG. 15 and FIG. 18, the following describes a structure of the wire harness board 2 for connecting the circuit board 3. The wire harness board 2 further includes a connection portion 25 connected to the body 20, and a mounting hole 31 is correspondingly provided in the circuit board 3. The connection portion 25 snaps into the mounting hole 31.

In some embodiments, a gap is present between part of an edge of the connection portion 25 and the body 20.

When the circuit board 3 is not at the mounting position, the connection portion 25 and the mounting hole 31 are not aligned. When the circuit board 3 is at the mounting position, the positions of the connection portion 25 and the mounting hole 31 are just aligned, and the connection portion 25 snaps into the mounting hole 31.

A gap is present between part of an edge of the connection portion 25 and the body 20, so that the connection portion 25 can swing up and down relative to the body 20. One end of the connection portion 25 is fixedly connected to or integrated with the body 20, the other end of the connection portion 25 is a free end, and a gap is present between the free end of the connection portion 25 and the body 20. In a process of mounting the circuit board 3, the free end of the connection portion 25 is deformed under the pressure of the circuit board 3. When the circuit board 3 is mounted in place, the positions of the connection portion 25 and the mounting hole 31 are just aligned, and the connection portion 25 snaps into the mounting hole 31 under the action of its own elastic force. The shape of the free end of the connection portion 25 is, for example, a block or another shape that can be snapped into the mounting hole 31.

In some embodiments, at least two connection portions 25 are dispersedly disposed at the wire harness board 2, and at least two mounting holes 31 are correspondingly provided in the circuit board 3. The connection portions 25 and the mounting holes 31 are in a one-to-one correspondence.

Figure 18:
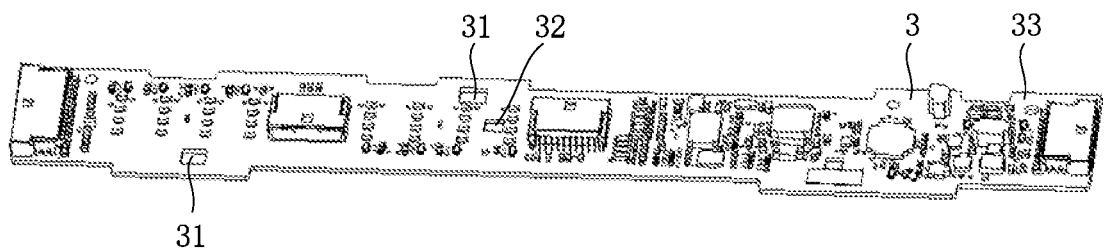
FIG. 18 is a three-dimensional schematic structural diagram of a circuit board of a battery module according to an embodiment of this application.

In the cases shown in FIG. 15 and FIG. 18, three connection portions 25 are dispersedly disposed at the wire harness board 2, and three mounting holes 31 are correspondingly provided in the circuit board 3. This is merely a case. In practical applications, a quantity and positions of connection portions 25 may be set based on an actual need, to meet the requirement for snapping the wire harness board 2 into the circuit board 3.

In the foregoing technical solution, the wire harness board 2 is connected to the circuit board 3 by a design using many sets of matched connection portions 25 and mounting holes 31. Moreover, this connection is strong enough and no excessive pressure is applied by the circuit board 3 on the elastic part 22 of the wire harness board 2, so that the thermistor 41 is not under excessive pressure, which effectively reduces cases that the thermistor 41 is damaged and fails due to excessive pressure, and increases reliability of the temperature sensing assembly 4 to sense the temperature.

Referring to FIG. 4 to FIG. 8, the following describes how to mount the circuit board 3 onto the wire harness board 2. A first positioning portion 33 is provided at an edge of the circuit board 3, and the first positioning portion 33 is specifically a convex portion. A second positioning portion 26 is correspondingly provided at the wire harness board 2. For example, the second positioning portion 26 is specifically a boss. A gap M is present between the second positioning portion 26 and a surface of the wire harness board 2 abutting on the circuit board 3. The first positioning portion 33 is at least partially accommodated in the gap M.

The first positioning portion 33 and the second positioning portion 26 are constructed to match together in mounting, so that the circuit board 3 can be mounted into the foregoing gap. After mounting, the first positioning portion 33 and the second positioning portion 26 are matched, so that the circuit board 3 is securely mounted.

Figure 7:
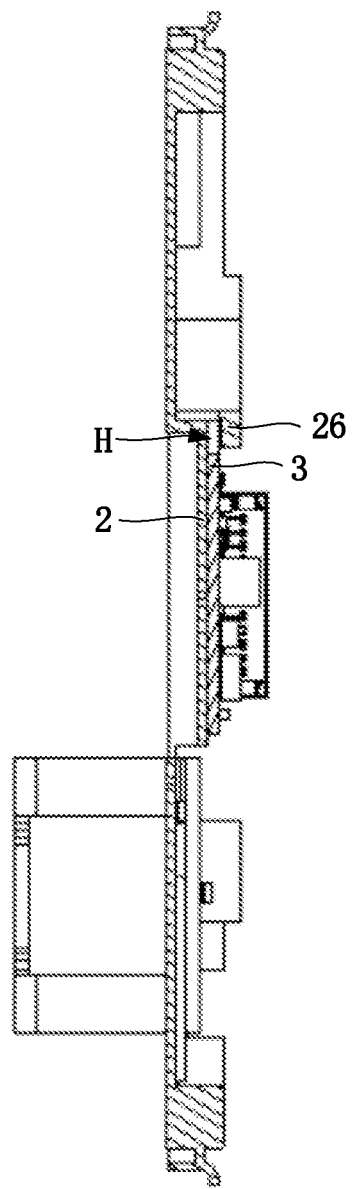
FIG. 7 is a schematic cross-sectional view taken along a line G-G in FIG. 5.
Figure 8:
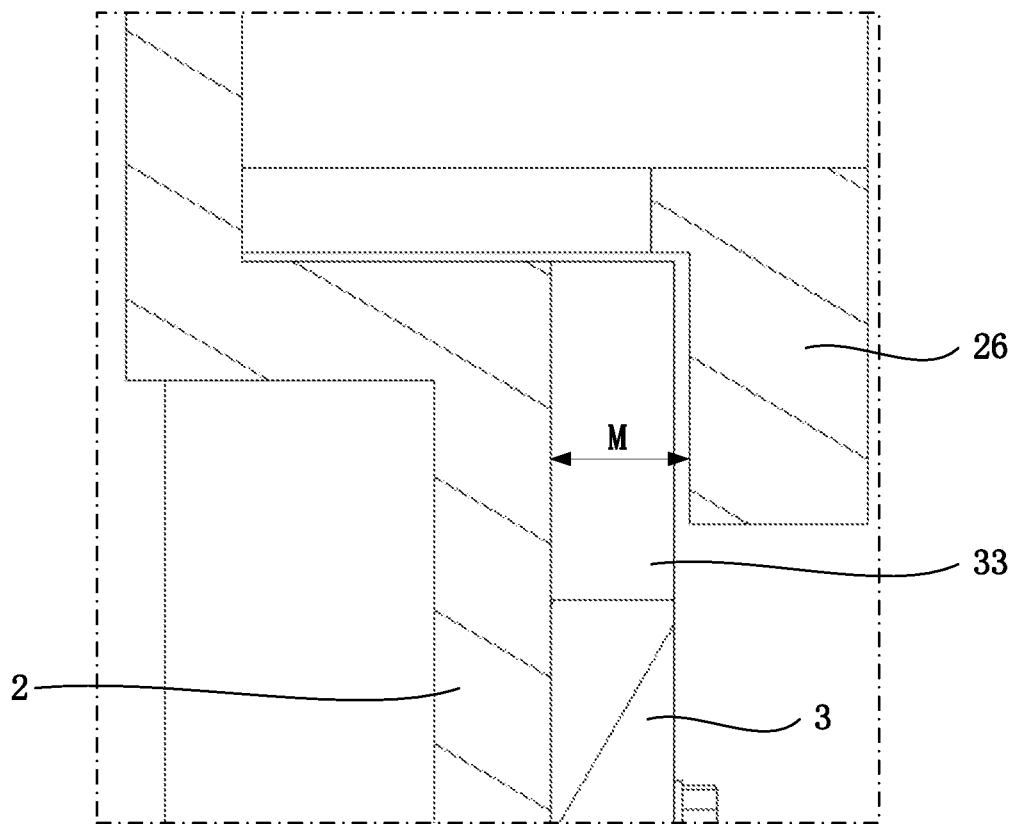
FIG. 8 is a local enlarged schematic diagram of H in FIG. 7.
Figure 9:
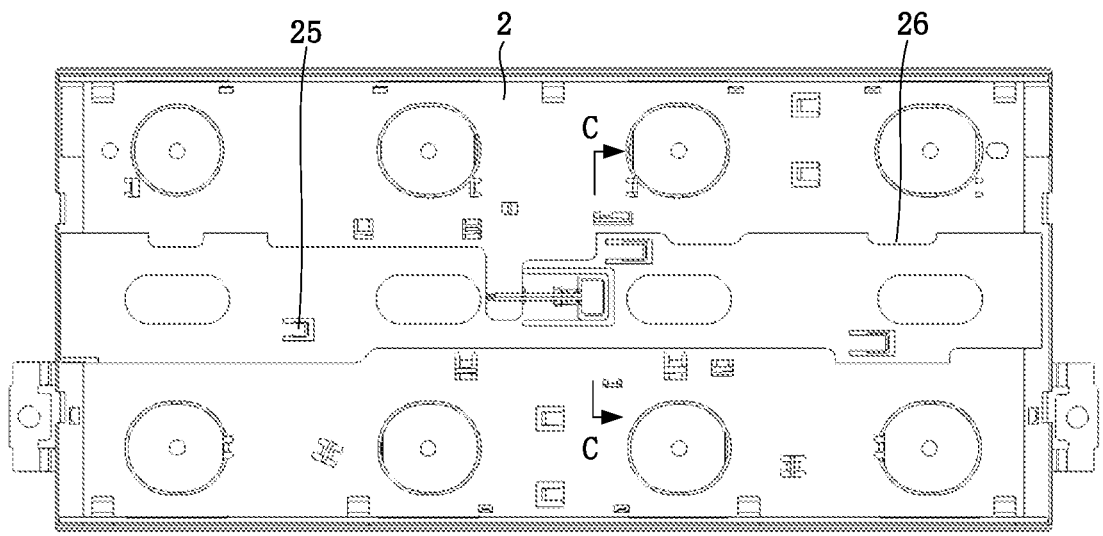
FIG. 9 is a schematic position diagram of a wire harness board and a circuit board of a battery module which are mounted in place according to an embodiment of this application.
Figure 10:
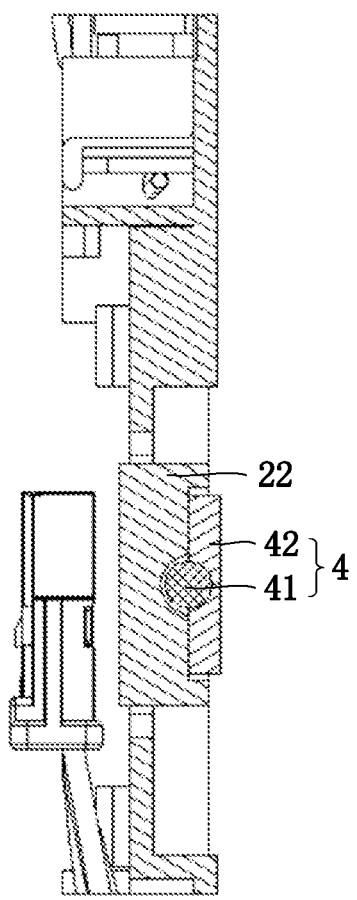
FIG. 10 is a schematic cross-sectional view taken along a line C-C in FIG. 9.

The second positioning portion 26 is located at the top of the wire harness board 2, and a gap M is present between the second positioning portion 26 and the surface of the wire harness board 2 abutting on the circuit board 3. As shown in FIG. 7 and FIG. 8, the gap M is used to accommodate the edge portion of the circuit board 3, to restrict displacement of the circuit board 3 in the height direction of the battery module.

During mounting, the first positioning portion 33 and the second positioning portion 26 should not be aligned first, and then the circuit board 3 is pressed down in the direction where the wire harness board 2 is located, so that the circuit board 3 abuts against the wire harness board 2. Then, the circuit board 3 is pushed along the length direction of the circuit board 3 so that the mounting hole 31 of the circuit board 3 is aligned with the connection portion 25 of the wire harness board 2. After the connection portion 25 snaps into the mounting hole 31, the mounting of the circuit board 3 and the wire harness board 2 is completed. In this case, the first positioning portion 33 and the second positioning portion 26 are matched, that is, the first positioning portion 33 is at least partially accommodated in the gap M, and the second positioning portion 26 plays a role of limiting and blocking the circuit board 3, preventing the circuit board 3 from being detached from the wire harness board 2. In the foregoing technical solution, the first positioning portion 33 and the second positioning portion 26 which are matched are used to limit the circuit board 3. In this way, the structure is compact and reliable.

The following describes a structure of the temperature sensing assembly 4.

Referring to FIG. 17, the temperature sensing assembly 4 includes the thermistor 41 and the thermal pad 42. The thermistor 41 is sandwiched between the mounting portion 21 and the thermal pad 42, and the thermal pad 42 abuts against the top cover 12.

The thermal pad 42 of the temperature sensing assembly 4 and an end of the thermistor 41 are disposed close to the negative electrode terminal 112 of the battery 1. The thermal pad 42 is in direct contact with the top cover 12, so the temperature of the top cover 12 can be accurately transferred to the thermistor 41 of the temperature sensing assembly 4. The size, thickness, material, and shape of the thermal pad 42 should meet the mounting requirements, and the mounting portion 21, the thermistor 41, and the thermal pad 42 need to be in close contact. With close contact of the foregoing three components, heat transfer is more reliable. Air heat transfer due to a gap caused by non-contact between the components should be avoided to the greatest extent possible, and the inaccurate temperature sensing caused by the air heat transfer should also be avoided. In this way, the temperature sensed by the thermistor 41 is more accurate, and can more truly reflect the temperature of the top cover 12, and accurately reflect the temperature inside the battery 1.

The thermistor 41 of the temperature sensing assembly 4 may be a patch type NTC (Negative Temperature Coefficient, negative temperature coefficient) temperature sensor, or a water drop type NTC temperature sensor.

In some embodiments, the thermistor 41 is the water drop type NTC temperature sensor. The water drop type NTC temperature sensor includes a head and a wire connected to the head. The head is in the shape of a water drop, so it can also be called a water drop head or end. The water drop is sandwiched between the elastic part 22 of the mounting portion 21 and the thermal pad 42. One end of the wire close to the head is fixed by a buckle structure, for example, to ensure a reliable connection of the wire.

The temperature inside the battery 1 is directly transferred to the top cover 12, the temperature of the top cover 12 is directly transferred to the thermal pad 42, and the thermal pad 42 transfers the temperature directly to the water drop head. The water drop head senses the temperature, and then transfers the sensed temperature through the wire to the subsequent circuit board 3. The electrical connection between the thermistor 41 and the circuit board 3 will be described in detail later.

The thermistor 41 is electrically connected to the circuit board 3, so that the temperature sensed by the thermistor 41 is transferred to the circuit board 3 for subsequent analysis and processing, and then operating state control of the battery module.

Figure 11:
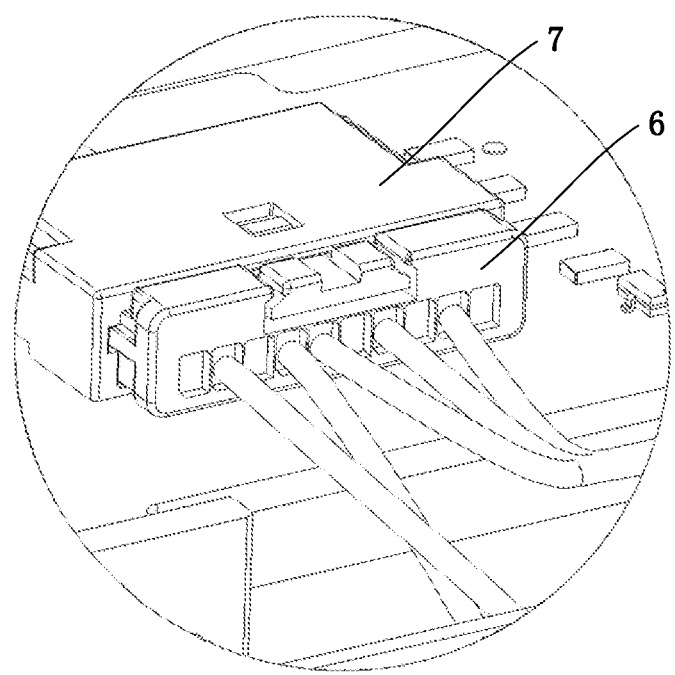
FIG. 11 is a local enlarged schematic diagram of A in FIG. 1.

Specifically, referring to FIG. 11, the thermistor 41 is connected to a connector plug 6, a connector socket 7 is provided at the circuit board 3, and the connector plug 6 is plugged into the connector socket 7, so that the thermistor 41 is electrically connected to the circuit board 3.

Specifically, the end of the wire of the thermistor 41 leaving the head is electrically connected to the connector plug 6. Existing products may be used as the connector plug 6 and the connector socket 7. Based on the foregoing connection manner, the electrical connection between the thermistor 41 and the circuit board 3 is conveniently implemented. In addition, the electrical connection is reliable, and the mounting is simple and efficient.

Referring to FIG. 18, to observe whether the thermal pad 42 is mounted in place, an observation hole 32 is also provided in the circuit board 3, and the observation hole 32 is located above the cavity 24. The size set for the observation hole 32 should satisfy an observation requirement. Through the observation hole 32, it can be observed whether the position of the thermal pad 42 is accurate. In the technical solution provided in the foregoing embodiment, the thermistor 41 is firmly mounted in the mounting portion 21 through the elastic part 22 and the coaming 23, and the observation hole 32 can be used to observe whether the thermal pad 42 is mounted in place. When the battery module is operating under severe working conditions, the head and the wire of the thermistor 41 are not easily shifted or loosened, so the accuracy and reliability of the temperature sensing are improved.

Referring to FIG. 13 to FIG. 15, the following describes a mounting process of the temperature sensing assembly 4.

After the battery module is assembled to a semi-finished product, the thermistor 41 and the thermal pad 42 are mounted into the mounting portion 21. Then the circuit board 3 is mounted onto the wire harness board 2, and the connector plug 6 connected to the thermistor 41 is plugged into the connector socket 7 on the circuit board 3, so that the thermistor 41 is electrically connected to the circuit board 3, and a temperature signal of the top cover 12 sensed by the thermistor 41 can be transferred to the circuit board 3.

In the battery module provided in the foregoing technical solution, the temperature of the top cover 12 is transferred to the thermistor 41 of the temperature sensing assembly 4 through a short transfer path. In this way, a temperature transfer response is fast, a temperature loss is low, and a measurement result is accurate. Moreover, the temperature at a part of the top cover 12 close to the negative electrode terminal 112 is basically the same as the temperature inside the battery 1, and the temperature sensed by the thermistor 41 basically accurately reflects the temperature inside the battery 1. In some embodiments, the temperature transfer path is short, and a temperature change inside the battery 1 can also be reflected as a temperature change of the top cover 12 in a timely manner, so that the temperature sensed by the thermistor 41 also changes in a timely manner. This provides accurate temperature data for processing by the circuit board 3, makes control more accurate, and effectively reduces or even prevents occurrence of discharge power limitation performed by the battery module in advance.

An embodiment of this application further provides a battery pack, including the battery module according to any one of the technical solutions of this application.

Having the battery module provided in any one of the technical solutions of this application, the battery pack provided in the foregoing technical solution also has the various structures and the beneficial effects of the battery module mentioned above.

An embodiment of this application further provides a device, including the battery pack according to any one of the technical solutions of this application, and the battery pack is configured to provide electrical energy.

For example, the device is specifically transportation equipment, or an energy storage cabinet. The transportation equipment is, for example, an electric vehicle, or a ship.

Having the battery pack provided in any one of the technical solutions of this application, the device provided in the foregoing technical solution also has the various structures and the beneficial effects of the battery pack mentioned above.

In the descriptions of this application, it should be understood that the orientations or positional relationships indicated by the terms "center", "vertical", "transverse", "front", "rear", "left", "right", "perpendicular", "horizontal", "top", "bottom", "inside", "outside", and the like are based on the orientations or positional relationships shown in the accompanying drawings, are merely intended to facilitate the descriptions of this application and simplify the descriptions, are not intended to indicate or imply that the mentioned apparatuses or components must have specific orientations, or be constructed and operated for a specific orientation, and therefore shall not be construed as a limitation to the content protected by this application.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery module, comprising:
    a battery, comprising a top cover;
    a wire harness board, disposed on an outer side of the top of the top cover, wherein the wire harness board comprises a body and a mounting portion disposed at the body;
    a circuit board, connected to the wire harness board; and
    a temperature sensing assembly, mounted at the mounting portion and pressed by the circuit board closely against the top cover,
    wherein the temperature sensing assembly comprises:
        a thermistor, electrically connected to the circuit board, and
        a thermal pad, wherein the thermistor is sandwiched between the mounting portion and the thermal pad, and the thermal pad abuts against the top cover; and
    wherein the mounting portion comprises:
        an elastic part, wherein the elastic part is connected to the body, a gap is present between part of an edge of the elastic part and the body, and the thermistor abuts against the elastic part, and
    a coaming, disposed around the elastic part and forming a cavity with the elastic part, wherein the thermistor is located within the cavity and abuts against the elastic part, and the thermal pad is sandwiched between the thermistor and the top cover.

2. The battery module according to claim 1, wherein an observation hole is provided in the circuit board, and the observation hole is located above the cavity.

3. The battery module according to claim 1, wherein the wire harness board further comprises a connection portion connected to the body, a mounting hole is correspondingly provided in the circuit board, and the connection portion snaps into the mounting hole.

4. The battery module according to claim 3, wherein a gap is present between part of an edge of the connection portion and the body.

5. The battery module according to claim 1, wherein a first positioning portion is provided at an edge of the circuit board, a second positioning portion is provided at the wire harness board, a gap is present between the second positioning portion and a surface of the wire harness board abutting on the circuit board, and at least part of the first positioning portion is accommodated in the gap.

6. A battery pack, comprising the battery module according to claim 1.

7. A device, comprising the battery pack according to claim 6, wherein the battery pack is configured to provide electrical energy.

* * * * *